United States Patent [19]

Hazenbroek

[11] Patent Number: 4,884,318

[45] Date of Patent: Dec. 5, 1989

[54] HINGED POULTRY DEFEATHERING APPARATUS

[76] Inventor: Jacobus E. Hazenbroek, Burg. de Zeeuwstraat 52, Numansdorp, Netherlands

[21] Appl. No.: 299,259

[22] Filed: Jan. 23, 1989

[51] Int. Cl.⁴ .............................................. A22C 21/02
[52] U.S. Cl. ...................................... 17/11.1 R; 17/47
[58] Field of Search ............................... 17/11.1 R, 47

[56] References Cited

U.S. PATENT DOCUMENTS

| | | | |
|---|---|---|---|
| 2,484,235 | 10/1949 | Mead | 17/11.1 R |
| 3,596,309 | 8/1971 | Vertegaal | 17/11.1 R |
| 4,179,772 | 12/1979 | Harben, Jr. | 17/11.1 R |
| 4,217,678 | 8/1980 | Crawford et al. | 17/11.1 R |
| 4,514,879 | 5/1985 | Hazenbroek | 17/11.1 R |

FOREIGN PATENT DOCUMENTS 2098454 11/1982 United Kingdom ............ 17/11.1 R

*Primary Examiner*—Willis Little
*Attorney, Agent, or Firm*—Thomas & Kennedy

[57] ABSTRACT

A poultry defeathering apparatus [10] is provided including a support frame [11] and a pair of opposed banks of picking fingers [12,13] mounted thereon. First bank [12] is mounted to carriers [23,24] and second bank [13] is mounted to carriers [25,26], with each carrier [23-25] being movably mounted upon the support frame [11] to provide adjustment of the spacing of the banks of pickers. The first bank [12] is releasibly supported at one end upon first carrier [23] by means of a latch assembly [28] while a second end of the bank is pivotably supported upon second carrier [24] by means of a hinge assembly [29]. The hinge assembly [29] and the latch assembly [28] allow the first bank [12] to be pivoted about one end of the bank and away from the opposing bank [13], providing ready access to the picking fingers for maintenance and repair. A retractable support wheel assembly [40] is provided for supporting the end of the first bank [12] to be disengaged from the latch assembly [28] and swung open. A pair of linkage assemblies [31,36] provide adjustment of the spacing of the opposed banks of pickers [12,13] with respect to each other.

18 Claims, 3 Drawing Sheets

HINGED POULTRY DEFEATHERING APPARATUS

TECHNICAL FIELD

This invention relates to poultry defeathering apparatus for use where the poultry are moved along a processing path with the birds hanging from an overhead conveyor, and more particularly to a defeathering apparatus having a hinged arrangement of banks of flexible picking fingers, whereby the birds are moved between the banks and defeathered, and when the defeathering apparatus is not in use, the machine can be opened for cleaning and maintenance.

BACKGROUND OF THE INVENTION

In the commercial processing of poultry, the birds are suspended by their feet on an overhead conveyor system and are moved through processing stations at which the birds are killed, defeathered, and their feet are removed. Conventional defeathering apparatus include a multiple number of flexible fingers mounted on rotary discs and/or rotary drums which engage the bird carcass and rub against the feathers and the skin of the bird to remove the feathers from the skin.

As the defeathering apparatus is positioned in a sequential series of other poultry processing operations, it is important that the defeathering apparatus be easily maintained and repaired. Any "downtime" of the defeathering apparatus usually causes a wave of downtime with respect to the other machines along the processing line.

The prior art defeathering apparatus commonly include banks of picking discs arranged on either side of the poultry processing line. Each bank includes several rotary picking discs which have flexible picking fingers mounted thereto. The rotary picking discs of each bank are driven by a motor and arranged within a cabinet. As the bird moves between the opposed banks of picking discs, the motor rotates the picking discs and thereby the picking fingers, to cause the picking fingers to rub against the carcass of the bird. The banks of picking fingers are adjustable so that the picking fingers can engage substantially the entire surface of the poultry carcass.

The prior defeathering apparatus also include a mechanism for adjusting the spacing of the banks of picking fingers with respect to one another. The prior art includes U.S. Pat. Nos. 3,596,309 of Vertegaal; 3,747,159 of Harbin; 4,217,678 of Crawford et al; and 4,514,879 of Hazenbroek. These patents teach apparatus which allow the orientation of the picking discs to be adjusted and the spacing of the banks of picking fingers to be adjusted.

Vertegaal, Harbin, Crawford et al generally teach an apparatus in which access to the picking fingers for maintenance is provided by adjusting the spacing of the banks of picking fingers to the maximum extent possible. However, even when the banks of picking fingers are moved apart their maximum distance, the worker does not have sufficient room to conveniently and rapidly replace the worn picking fingers.

The known prior art does not provide a simple, economical, reliable, and effective mechanism for providing easy access for maintenance and replacement of picking fingers in a defeathering apparatus which permits the banks of picking fingers to be moved away from each other a distance which permits a worker to conveniently remove and replace picking fingers. Accordingly, it is to this end that the present invention is primarily directed.

SUMMARY OF THE INVENTION

Briefly described, the present invention comprises a poultry defeathering apparatus including a support frame for supporting opposed banks of flexible feather picking fingers. The banks of feather picking fingers are of conventional design and as such the number and orientation of rotary picking discs maybe varied according to the particular need at hand. The support frame includes a hinged arrangement whereby one bank of pickers maybe swung open and away from the opposite bank of pickers, thereby allowing unimpeded access to the picking fingers for maintenance and repair.

The support frame includes support means for releasibly supporting a first end of one of the banks on the support frame, and a second support means for pivotably supporting a second end of the bank upon the support means for movement about a vertical axis.

Thus, it is an object of this invention to provide an apparatus for defeathering poultry which includes means for providing ready access to the picking fingers for maintenance and repair.

It is another object of this invention to provide an improved poultry defeathering apparatus which provides unimpeded access to the picking fingers while leaving the spacing of the banks of picking fingers undisturbed.

Other objects, features, and advantages of the present invention will become apparent upon reading the following specification when taken in conjunction with the accompanying drawings.

DETAILED DESCRIPTION

Figure 1:
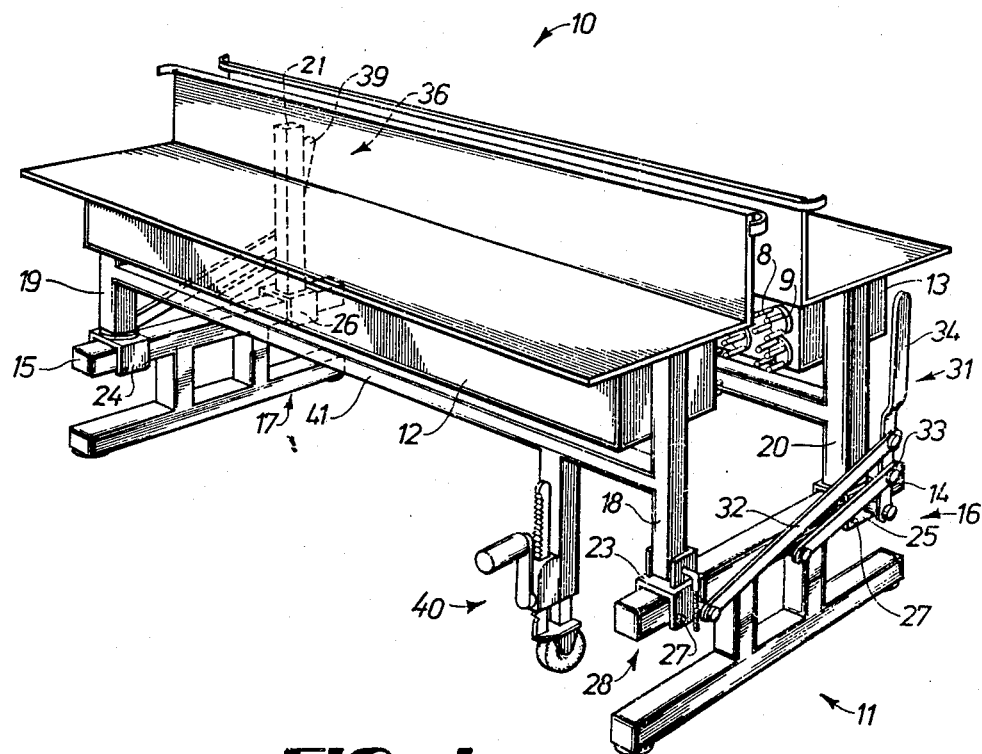
FIG. 1 is front right perspective illustration of the hinged poultry carcass defeathering apparatus.
Figure 2:
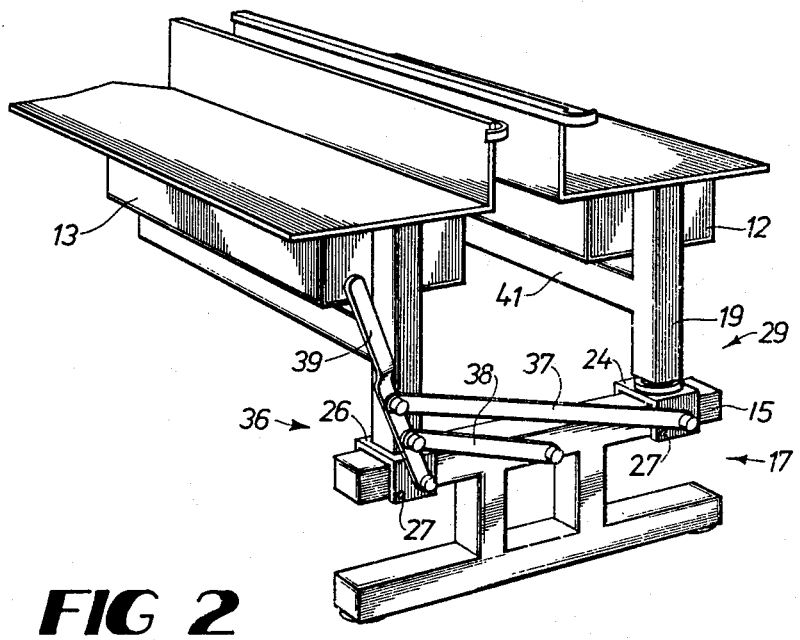
FIG. 2 is a left rear perspective illustration of a portion of the hinged defeathering apparatus.

Referring now in more detail to the drawings, in which like numerals indicate like parts throughout the several views, FIGS. 1 and 2 illustrate the hinged poultry defeathering apparatus 10 which includes a support frame 11 and a pair of banks 12 and 13 of conventional flexible picking fingers mounted upon the support frame. The picking fingers 8 are mounted in discs 9 and the discs are rotated so that their fingers rub against the poultry carcasses to remove the feathers of the carcasses.

Support frame 11 includes a first end frame 16 and a second end frame 17. The end frames have horizontal support bars 14 and 15 respectively. First bank of picking fingers 12 is mounted to upright stanchions 18 and 19, with second bank 13 mounted to third stanchion 20 and fourth stanchion 21. Stanchions or upright members 18, 19, 20 and 21 are in turn mounted to carriers or saddle supports 23, 24, 25 and 26 respectively, with the saddle supports 23-26 straddling support bars 14 and 15. Stanchion 18 is mounted to carrier 23 by means of a latch assembly 28 (FIG. 4), while stanchion 19 is mounted to carrier 24 by means of a hinge assembly 29 (FIG. 3).

As illustrated in FIGS. 1,2,5 and 6, a first linkage assembly 31 is pivotably mounted to end frame 16, to carrier 23, and to carrier 25. Linkage 31 comprises a first linkage arm 32, second linkage arm 33, and a lever arm 34. A second linkage assembly 36 is likewise pivotably mounted to second end frame 17 and to carriers 24 and 26. Linkage 36 includes linkage arms 37 and 38 and a lever arm 39. When the lever arms 34 or 39 are tilted, the saddle supports 23-26 move closer together or further apart along their support bars 14 and 15, which causes the banks of picking fingers to move closer to or further away from each other.

Figure 3:
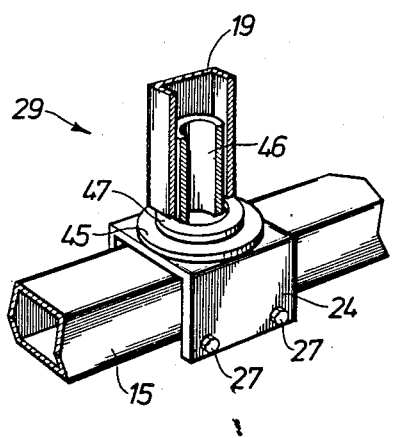
FIG. 3 is a front right perspective illustration of a portion of the apparatus, showing the frame hinge in detail with some elements partially cut away.
Figure 5:
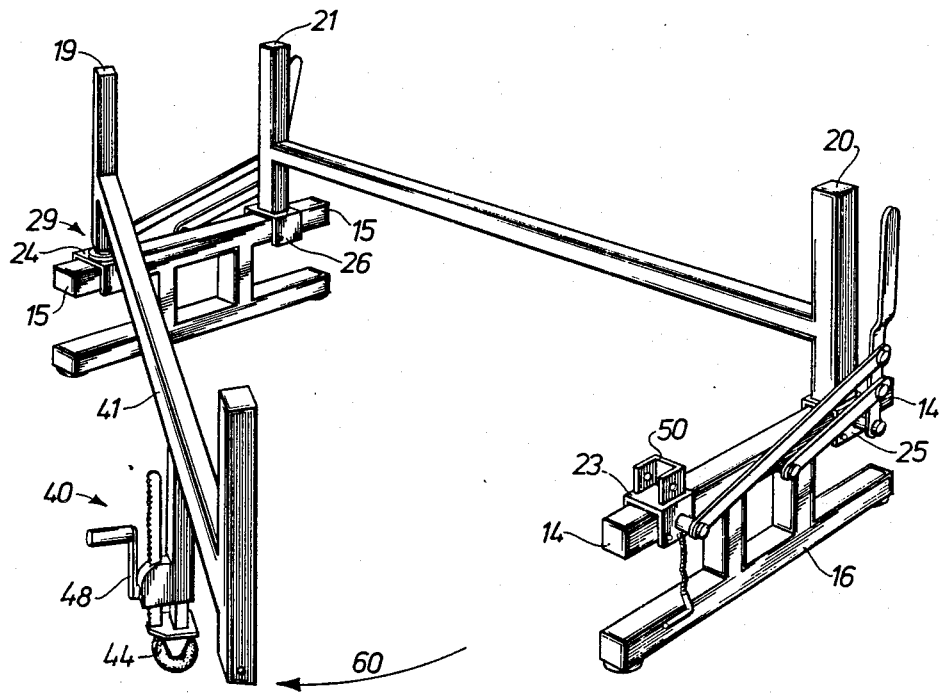
FIG. 5 is a perspective illustration of a portion of the apparatus, showing the support frame in the open position.

A best seen in FIG. 3, hinge assembly 29 includes a lower bearing disk 45 and an upwardly extending hinge post 46 which are welded together. Bearing disk 45 is welded to an upper portion of carrier 24. Upright stanchion 19 is telescopically inserted over the hinge post 46 and is rotatable with respect to the hinge post. A washer 47 is positioned between the lower end surface of the stanchion 19 and the upper surface of disk 45. This permits the stanchion 19, and the bank of feather pickers mounted thereto, to pivot about the upright hinge post 46. FIG. 5 illustrates the frame without the banks of picking fingers and demonstrates the frame in its open configuration, whereas FIG. 6 demonstrates the frame in its closed configuration.

Figure 4:
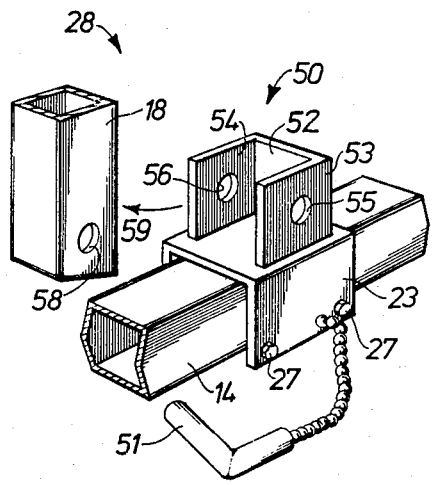
FIG. 4 is a front right perspective illustration of a portion of the apparatus, showing the frame latch in detail.

As illustrated in FIG. 4, latch assembly 28 includes a receptacle 50 rigidly mounted to an upper portion of carrier 23, a lower portion of stanchion 18 and a lock bolt 51. Receptacle 50 includes a pair of upright opposed panels 53 and 54 having openings 55 and 56 and a back panel 52. A hole or opening 58 in stanchion 18 and the openings 55 and 56 become aligned when the stanchion 18 is inserted into the receptacle, and lock bolt 51 may then be inserted through the aligned openings to lock the stanchion in the latch assembly 28.

When bolt 51 is removed from the receptacle 50, the stanchion 18 is free to move in a horizontal arc out of the receptacle 50 as indicated by arrow 59.

Figure 7:
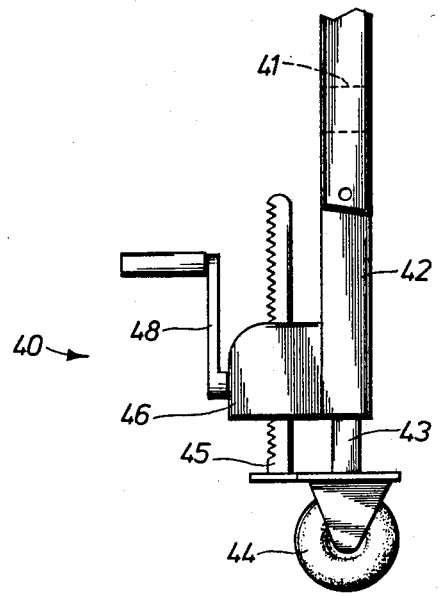
FIG. 7 is a side view of the retractable wheel assembly.

As illustrated in FIG. 7, retractable support wheel assembly 40 is mounted to the horizontal frame element 41. The wheel assembly includes hollow post 42, wheel support bar 43 telescopically received at its upper end in the lower end of post 42, a wheel assembly 44 mounted on the lower end of wheel support bar 43, ratchet bar 45 connected at its lower end to wheel assembly 44, and crank assembly 46. Crank assembly 46 is mounted to post 42 and includes internal gears and a crank 48 which, when rotated, causes the wheel 44 to be raised or lowered.

When the wheel assembly is lowered so as to engage the floor surface and support its end of the bank of picking fingers 12, the end portion of the horizontal cross beam 41 and stanchion 18 can be moved away from its horizontal support bar 14, with the wheel 44 rolling on the floor of the processing plant.

OPERATION

Figure 6:
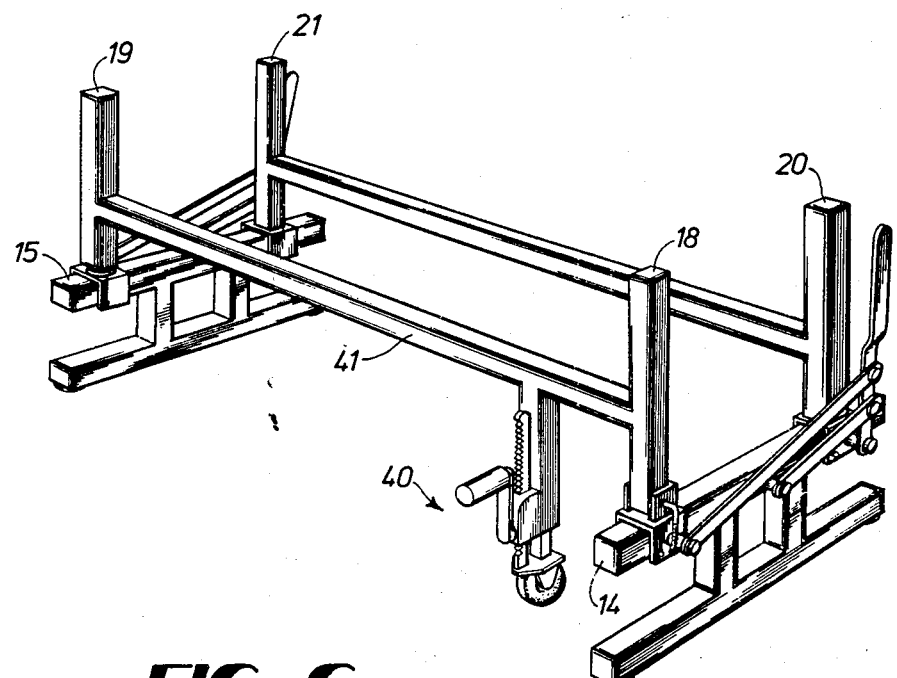
FIG. 6 is a perspective illustration of a portion of the apparatus, showing the support frame in the closed position.

When the poultry defeathering apparatus 10 is in operation, the first bank 12 of flexible picking fingers is in close spaced relationship with respect to the opposite bank 13 as illustrated in FIGS. 1 and 2. In this operating mode, the elements of the support frame 11 will be in the closed position as shown in FIGS. 1,2, and 6. When first bank 12 is to be opened away from second bank 13, such as for cleaning or repair, the support wheel assembly 40 is lowered by operation of the hand crank 48 so that wheel 44 bears the load of the end of the bank 12. The latch assembly 28 is then opened by removing lock bolt 51 from openings 55, 56 and 58, as best seen in FIG. 4. The bank 12 can then be opened to a position splayed from bank 13 by simply rolling one end of bank 12 away from the opposite bank, as indicated by arrow 60 of FIG. 5.

To close the poultry defeathering apparatus for operation, the procedure is reversed. The first bank 12 is rolled back into engagement with the latch assembly 28, so that the lower portion of stanchion 18 engages receptacle 50. With the openings 55, 56 and 58 now aligned, lock bolt 51 is inserted through the aligned openings to secure the stanchion in the receptacle. Next, one would typically raise support wheel 44 by operation of hand crank 48.

As seen in FIGS. 1, 2, 5 and 6, the spacing of banks of 12 and 13 maybe adjusted by operation of linkage assemblies 31 and 36 but the selected spacing is not lost when the bank of fingers 12 is opened away from the bank 13 since the carrier 23 usually is not moved during the opening and closing functions. For example, to adjust the spacing of the banks 12 and 13 at the end of the banks adjacent the first end frame 16, one would first loosen the carrier securing bolts 27 of each carrier 23 and 25. With the bolts now loosened, one would grasp lever arm 34 and either push it toward the center of end frame 16 or pull it away from the center of end frame 16, depending upon the adjustment desired. Pushing lever arm 34 toward the center of end frame 16 (the path of the poultry processing line) causes carrier 23 to move away from the center of the end frame, while at the same time causing carrier 25 to also move away from the center of the end frame 16. Conversely, moving lever arm 34 away from the center of frame 16 causes the two carriers 23 and 25 to move together toward the center of end frame 16. With this first end of the banks 12 and 13 now properly adjusted, one would likewise employ linkage assembly 36 to adjust the spacing of the opposite end of banks 12 and 13.

It should understood that the forgoing description relates only to a preferred embodiment of the present invention and that numerous modifications or alterations maybe made therein with departing from spirit and scope of the invention, as set forth in the following claims.

I claim:

1. Apparatus for picking feathers from suspended poultry carcasses moving in succession along a predetermined path of travel comprising:
   a support frame for positioning along the path of travel of the poultry carcasses;
   first and second banks of flexible feather picking fingers mounted to said support frame for positioning on opposite sides of the path of travel of the poultry carcasses;

first support means for releasibly supporting a first end of said first bank upon said support frame; and second support means for pivotably supporting a second end of said bank opposite said first end upon said support frame for movement of said first bank about a vertical axis;

whereby the first bank can be pivoted toward and away from the second bank to allow the pickers to be cleaned or replaced.

2. The apparatus of claim 1 and further including retractable wheel means mounted to said first end of said first bank of picking fingers, whereby the wheel means can be lowered into supporting engagement with the floor surface as the first bank is pivoted toward and away from the second bank.

3. The apparatus of claim 1 and wherein said support means for releasibly supporting said first end of said first bank comprises a receptacle mounted to said support frame and a first member mounted to said first bank and adapted to be secured in said receptacle by means of a lock bolt.

4. The apparatus of claim 3 and wherein said support means for pivotably supporting said second end of said first bank comprises a hinged coupling between a hinge post mounted to said support frame and a second member mounted to said first bank.

5. The apparatus of claim 1 and further including means for varying the distance between said first and second banks.

6. The apparatus of claim 5 and wherein said distance varying means comprises first, second, third and fourth carriers movably mounted upon said support frame, with said first and third carriers mounted to said first bank and said second and fourth carriers mounted to said second bank.

7. The apparatus of claim 6 and further comprising a first linkage assembly attached to said first and second carriers and to said support frame for adjusting the distance between said first and second carriers, and a second linkage assembly attached to said third and fourth carriers and to said support frame for adjusting the distance between said third and fourth carriers.

8. The apparatus of claim 6 and wherein said receptacle is mounted to said first carrier.

9. The apparatus of claim 6 and wherein said support means for pivotably supporting said second end of said first bank comprises a hinged coupling between said third carrier and said second member mounted to said first bank.

10. Apparatus for defeathering poultry or the like as the poultry move along a processing path, comprising:

first and second feather picking means for removing feathers from poultry;

support means for movably supporting said first and second feather picking means on opposite sides of the processing path;

adjuster means for varying the distance between said first and second feather picking means upon said support means;

pivot means for moving said first feather picking means between a closed position adjacent said second feather picking means and an open position splayed horizontally from said second feather picking means; and securing means for securing said first feather picking means in said closed position.

11. The apparatus of claim 10 and wherein said support means comprises a frame and first, second, third and fourth carriers movably mounted to said frame, with said first feather picking means mounted to said first and second carriers and said second feather picking means mounted to said third and fourth carriers.

12. The apparatus of claim 10 and wherein said pivot means comprises said first feather picking means hingedly mounted to said second carrier.

13. The apparatus of claim 12 and wherein said securing means comprises:

a receptacle mounted to said first carrier, with said receptacle having an opening therein;

said first feather picking means including a member having an opening therein and being mounted for alignment with the opening of said receptacle; and a locking member flexibly attached to said first carrier for insertion into said openings when aligned.

14. The apparatus of claim 10 and wherein said adjuster means includes a linkage assembly comprising:

a lever arm rotatably attached at one end to said first picking means;

a first linkage arm rotatably attached at a first end to said lever arm and rotatably attached at a second end to said support means; and a second linkage arm rotatably attached at a first end to said lever arm and rotatably attached at a second end to said second picking means.

15. The apparatus of claim 14 and wherein said support means comprises a frame and first, second, third and fourth carriers movably mounted to said frame, with said first feather picking means mounted to said first and second carriers and said second feather picking means mounted to said third and fourth carriers.

16. The apparatus of claim 15 and wherein said lever arm is rotatably attached at said one end to one of said carriers with said second linkage arm rotatably attached to another of said carriers.

17. The apparatus of claim 10 and further including wheel means mounted to said first feather picking means for supporting said first feather picking means when said first feather picking means is moved away from said second feather picking means.

18. Apparatus for picking feathers from suspended poultry carcasses moving in succession along a predetermined path of travel comprising:

a support frame for positioning along the path of travel of the poultry carcasses, said support frame comprising a first end frame and a second end frame;

first and second carriers slidably mounted upon said first end frame;

third and fourth carriers slidably mounted upon said second end frame;

first and second banks of flexible feather picking fingers mounted on said carriers for positioning on opposite sides of the path of travel of the poultry carcasses;

first support means for releasibly supporting a first end of said first bank upon said first carrier; and second support means for pivotably supporting a second end of said first bank upon said third carrier for movement of said first bank about a vertical axis;

whereby the banks of picking fingers can be moved closer together or further apart by movement of the carriers, and the first bank of picking fingers can be pivoted away from the second bank of picking fingers to allow the pickers to be cleaned or replaced.

* * * * *